US009218578B2

(12) United States Patent
Burke, Jr.

(10) Patent No.: US 9,218,578 B2
(45) Date of Patent: Dec. 22, 2015

(54) METHODS AND SYSTEMS FOR MANAGING PRINT DEVICE LICENSES USING A CLOUD ADMINISTRATION SYSTEM (75) Inventor: Robert William Burke, Jr., Stanley, NY (US)

(73) Assignee: Xerox Corporation, Norwalk, CT (US)

( * ) Notice: Subject to any disclaimer, the term of this patent is extended or adjusted under 35 U.S.C. 154(b) by 355 days.

(21) Appl. No.: 13/112,625

(22) Filed: May 20, 2011

(65) Prior Publication Data

US 2012/0293831 A1    Nov. 22, 2012

(51) Int. Cl.
G06F 3/12    (2006.01)
G06Q 10/06  (2012.01)
G06Q 10/10  (2012.01)

(52) U.S. Cl.
CPC ............... G06Q 10/06 (2013.01); G06Q 10/10 (2013.01)

(58) Field of Classification Search
USPC ....................................................... 358/1.15
See application file for complete search history.

(56) References Cited

U.S. PATENT DOCUMENTS

| | | | |
|---|---|---|---|
| 5,305,199 A | 4/1994 | LoBiondo et al. | |
| 6,304,732 B1 | 10/2001 | Myers et al. | |
| 6,647,222 B1 | 11/2003 | Digby et al. | |
| 7,317,882 B2 | 1/2008 | Dombrowski | |
| 7,574,496 B2 | 8/2009 | McCrory et al. | |
| 7,587,146 B2 | 9/2009 | Horn | |
| 7,649,638 B2 | 1/2010 | Beard et al. | |
| 7,650,085 B2 | 1/2010 | Kehoe et al. | |
| 7,667,874 B2 | 2/2010 | MacDonald et al. | |
| 7,773,239 B2 | 8/2010 | Beard et al. | |
| 8,009,302 B2 | 8/2011 | Martin | |
| 8,139,238 B2 | 3/2012 | Oki | |
| 8,310,703 B2 | 11/2012 | Nuggehalli et al. | |
| 2004/0012808 A1 | 1/2004 | Payne et al. | |
| 2004/0034698 A1 | 2/2004 | Abu-Husein et al. | |
| 2004/0201867 A1 | 10/2004 | Katano | |
| 2006/0021012 A1* | 1/2006 | Ito | G06F 21/608 726/5 |
| 2007/0229876 A1* | 10/2007 | Takashima | 358/1.14 |
| 2009/0274304 A1* | 11/2009 | Kobayashi | G06F 21/10 380/277 |
| 2010/0098450 A1 | 4/2010 | Nakazawa | |
| 2010/0103445 A1 | 4/2010 | Levine et al. | |
| 2010/0332629 A1 | 12/2010 | Cotugno et al. | |

(Continued)

OTHER PUBLICATIONS

B. Pellow, "Moving to the Cloud", Business Development Services Analysis, Nov. 2010, InfoTrends 2010, pp. 1-7.

(Continued)

*Primary Examiner* — King Poon
*Assistant Examiner* — Andrew H Lam
(74) *Attorney, Agent, or Firm* — Fox Rothschild LLP (57) ABSTRACT

A cloud administration system for managing a print device license for a remote print device may include a processing module in communication with a plurality of print devices. The processing module may be located remotely from each of the plurality of print devices. The cloud administration system may include a storage module in communication with the processing module. The processing module may be configured to receive a print device license associated with a print device of the plurality of print devices, store the print device license in the storage module, and transmit the print device license to the print device. The cloud administration system may operate as a shared resource for each of the plurality of print devices. The print device license may include instructions for rendering the print device inoperable if the print device does not receive an approval notification from the cloud administration system within a time period.

8 Claims, 6 Drawing Sheets

(56) References Cited

U.S. PATENT DOCUMENTS

| | | |
|---|---|---|
| 2011/0030066 A1* | 2/2011 | Nakazawa ............. G06Q 30/06 726/26 |
| 2011/0047204 A1 | 2/2011 | Mansoor et al. |
| 2011/0292431 A1 | 12/2011 | Cok |
| 2011/0292435 A1 | 12/2011 | Cok et al. |
| 2012/0194857 A1 | 8/2012 | Yamada |
| 2013/0114100 A1 | 5/2013 | Torii et al. |
| 2013/0188213 A1 | 7/2013 | Burke, Jr. et al. |
| 2013/0215452 A1 | 8/2013 | Burke, Jr. |

OTHER PUBLICATIONS

A. Wawro, "Cloud Printers Rain on Security Parade", PC World, Apr. 2011, vol. 29, No. 4, p. 36.

* cited by examiner

METHODS AND SYSTEMS FOR MANAGING PRINT DEVICE LICENSES USING A CLOUD ADMINISTRATION SYSTEM

CROSS-REFERENCE TO RELATED APPLICATIONS

This application is related to U.S. patent application Ser. No. 13/112,245 entitled "Method and System for Managing Print Jobs Using a Cloud Administration System," Ser. No. 13/112,303 entitled "Method and System for Managing Print Device Information Using a Cloud Administration System," Ser. No. 13/112,396 entitled "Methods and Systems for Providing Software Updates Using a Cloud Administration System," Ser. No. 13/112,455 entitled "Methods and Systems for Tracking and Managing Print Device Inventory Information Using a Cloud Administration System," and Ser. No. 13/112,552 entitled "Method and System for Managing Print Device Information Using a Cloud Administration System," each filed on May 20, 2011.

BACKGROUND

Typically, print-related services and solutions require providing onsite resources to a customer, such as software, hardware and personnel. In addition, numerous print-related services and solutions may operate autonomously, even though they utilize similar delivery mechanisms and backend connectivity. As such, providing print-related services can often be costly and inefficient.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a cloud administration system for managing a print device license for a remote print device may include a processing module in communication with a plurality of print devices. The processing module may be located remotely from each of the plurality of print devices. The cloud administration system may include a storage module in communication with the processing module. The processing module may be configured to: receive a print device license associated with a print device of the plurality of print devices, store the print device license in the storage module, and transmit the print device license to the print device. The cloud administration system may operate as a shared resource for each of the plurality of print devices. The print device license may include one or more instructions for rendering the print device inoperable if the print device does not receive an approval notification from the cloud administration system within a time period.

In an embodiment, a method of managing a print device license may include receiving, by a cloud administration system, from an application computing device associated with a license management service, a print device license that corresponds to a print device, storing the print device license in a storage module of the cloud administration system, and transmitting, by the cloud administration system, the print device license to a print device in communication with the cloud administration system. The application computing device may be located remotely from the cloud administration system. The print device may be located remotely from the cloud administration system. The print device license may include one or more instructions for rendering the print device inoperable if the print device does not receive an approval notification from the cloud administration system within a time period.

In an embodiment, a method of managing a print device license may include sending, by a print device, a check-in request to a cloud communication system at a check-in time designated in a print device license associated with the print device, determining, by a print device, whether an approval notification has been received from a cloud administration system within a period of time after sending the check-in request, and in response to an approval notification not being received from a cloud administration system within the period of time, rendering the print device inoperable.

DETAILED DESCRIPTION

The following terms shall have, for the purposes of this application, the respective meanings set forth below.

An "application computing device" is a computing device capable of sending information to or receiving information from a cloud administration system.

A "cloud administration system" refers to one or more physical and/or logical devices that operate as a shared resource for multiple remote print devices and/or computing devices. Logical devices in a cloud administration system may be accessed without any knowledge of the corresponding physical devices.

A "computing device" or a "processor" refers to a computer or other machine that performs one or more operations according to one or more programming instructions. Exemplary computing devices may include personal computers, servers, mobile communication devices and/or the like. An exemplary computing device or processor is described in reference to FIG. 5.

A "firewall" is hardware and/or software used to protect a resource of a network from unauthorized external access.

A "job" refers to a logical unit of work that is to be completed for a customer.

A "license management service" is an entity that manages and/or tracks compliance of a user with a print device license.

A "logical device" is a representation of a physical device that uniquely identifies the corresponding physical device.

For example, a network interface may be assigned a unique media access control address that is the logical unique identifier of a physical device. As such, a conventional device is a combined logical and physical device in which the logical device provides the entire identity of the physical device.

A "module" is a component of a larger system, such as a cloud administration system.

An "operation" or "print-related function" is a function that is performed on a print job during production. Exemplary operations may include raster image processing, formatting, stapling, collating, sorting, punching, binding and/or the like.

A "physical device" is a physical resource such as a computing device, a computer-readable storage medium and/or the like.

A "print job" refers to a job that can be processed by a print device. For example, a print job may include a job that is to be printed, scanned or otherwise processed by a print device.

A "print device" refers to a device capable of performing one or more print-related functions. For example, a printing device may include a printer, a scanner, a copy machine, a multifunction device, a collator, a binder, a cutter or other similar equipment. A "multifunction device" is a device that is capable of performing two or more distinct print-related functions. For example, a multifunction device may have print and scan capabilities.

A "print device license" is a file that describes the usage rights associated with a print device.

A "queue" is a data structure stored on a computer-readable medium and configured to temporarily store information, including, but not limited to a print job, a print device license and/or the like.

The term "remote," as used herein with respect to computing devices and/or printing devices, refers to devices that operate on different computer networks and/or computer networks operated by different entities. For example, a computing device is remote from a printing device if the computing device is connected to a first LAN operated by a first entity and the printing device is connected to a second LAN operated by a second entity.

A "resource" is a physical device comprising a processor and/or a storage medium. Exemplary resources may include a computing device, a processing device, a storage device and/or the like.

A "shared resource" is a resource that may be accessed and used by a plurality of other resources.

A "source computing device" is a computing device that is capable of transmitting one or more print jobs to a cloud administration system.

A "storage module" or "SM" is a computer-readable storage medium or portion thereof.

"Virtualization" is a configuration that allows logical devices to exist as an abstraction without being directly tied to a specific physical device. Virtualization may be achieved using logical names instead of physical identifiers. For example, using a uniform resource locator instead of a server's media access control address effectively virtualizes the target server. Alternatively, an assigned media access control address may exist independently of the physical resources managing network traffic.

Figure 1A:
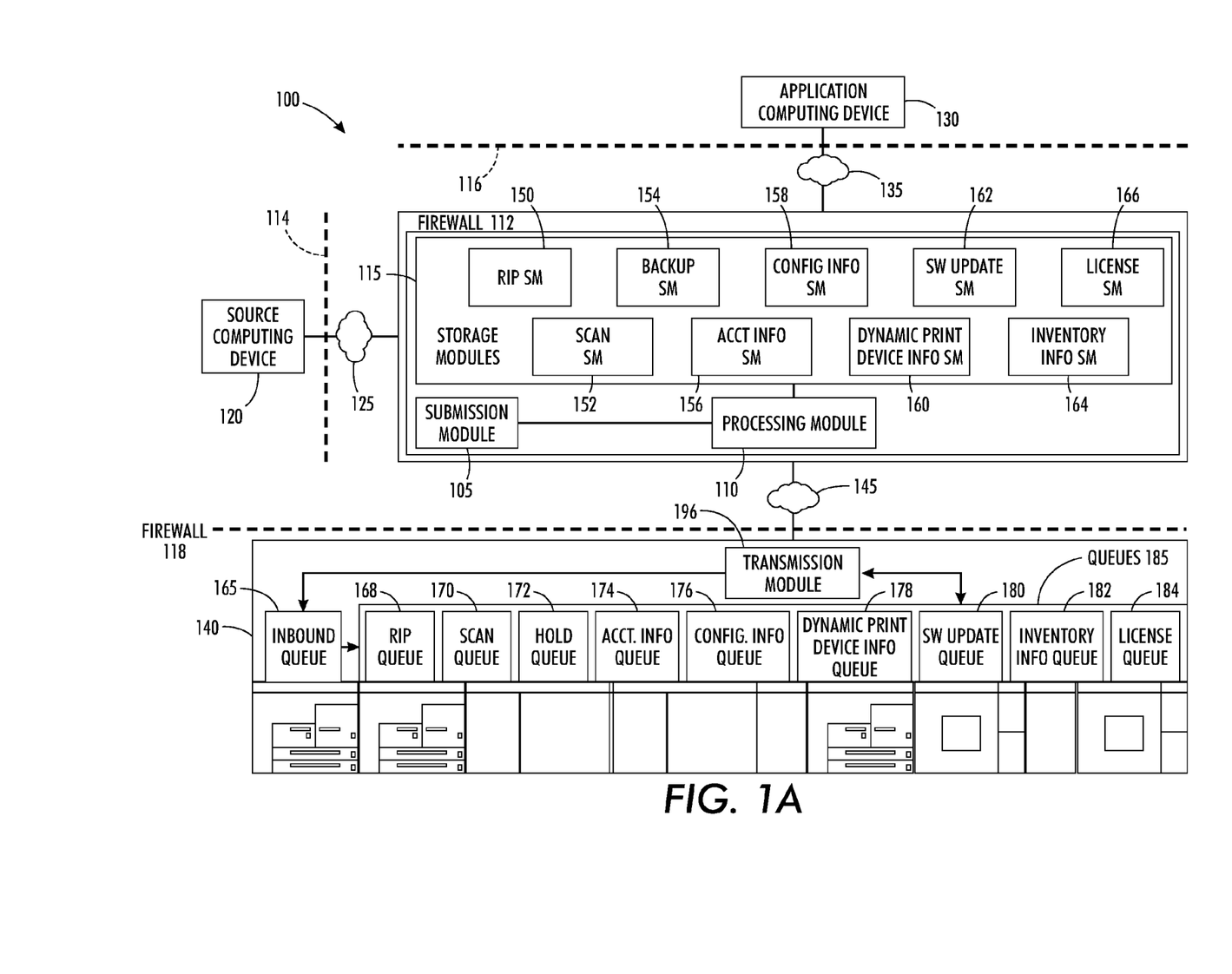
FIGS. 1A and 1B depict an exemplary cloud administration system according to an embodiment.

FIG. 1A illustrates an exemplary cloud administration system according to an embodiment. As illustrated by FIG. 1A, a cloud administration system 100 may include a submission module 105, a processing module 110 and one or more storage modules 115. The submission module 105 and/or one or more of the storage modules 115 may be in communication with the processing module 110. In an embodiment, all communication to or from the cloud administration system 100 may be through a firewall 112.

In an embodiment, a storage module 115 may correspond to an operation or type of operation to be performed on a print job, or it may correspond to the type of information it stores. For example, as illustrated by FIG. 1A, the storage modules 115 may include a raster image processing (RIP) storage module 150, a scan storage module 152, a backup storage module 154, an accounting information storage module 156, a configuration information storage module 158, a dynamic print device information storage module 160, a software update storage module 162, an inventory information storage module 164, a license storage module 166 and/or the like. Storage modules 115 are discussed in more detail below.

In an embodiment, a cloud administration system 100 may be in communication with one or more source computing devices 120. A source computing device 120 may be located remotely from the cloud administration system 100. In an embodiment, all source computing devices 120 may be located remotely from the cloud administration system 100. In an embodiment, a source computing device 120 may communicate with a cloud administration system 100 through a plurality of firewalls. For example, a communication from a source computing device 120 to a submission module 105 may pass through a firewall 114 associated with the source computing device and the firewall 112 associated with the cloud administration system 100.

In an embodiment, a source computing device 120 may communicate directly with a cloud administration system 100 over a network 125. In an embodiment, the network 125 may be operated by an entity. An entity may be a corporation, an organization, a group, an individual and/or the like. In an embodiment, a plurality of source computing devices 120 may communicate with the cloud administration system 100 over one or more networks.

In an embodiment, a cloud administration system 100 may be in communication with one or more application computing devices 130. An application computing device 130 may be in communication with the processing module 110 and/or one or more storage modules 115. In an embodiment, an application computing device 130 may communicate with the cloud administration system 100 through a plurality of firewalls. For example, a communication from an application computing device 130 to a processing module 110 may pass through a firewall 116 associated with the application computing device and the firewall 112 associated with the cloud administration system 100.

In an embodiment, an application computing device 130 may be located remotely from the cloud administration system 100. In an embodiment, each application computing device 130 may be located remotely from the cloud administration system 100. In an alternate embodiment, an application computing device 130 may be a component of the cloud administration system 100.

An application computing device 130 may communicate with the cloud administration system 100 over a network 135. In an embodiment, an application computing device 130 may communicate directly with a submission module 105 over a network 135. In an embodiment, an application computing device 130 may communicate with a submission module 105 through one or more firewalls.

An application computing device 130 may be located remotely from a source computing device 120. In an embodiment, each application computing device 130 may be located remotely from each source computing device 120. In an embodiment, the network 135 over which an application computing device 130 may communicate with a cloud administration system 100 may be operated by a different entity than that which operates a network over which a source computing device 120 may communicate with the cloud administration system.

In an embodiment, a cloud administration system 100 may be in communication with one or more print devices 140. A print device 140 may be located remotely from the cloud administration system 100 and may communicate with the cloud administration system over one or more networks 145. In an embodiment, each print device 140 may be located remotely from the cloud administration system 100.

In an embodiment, a print device 140 may communicate with a cloud administration system 100 through a plurality of firewalls. For example, a communication from a print device 140 to a cloud administration system 100 may pass through a firewall 118 associated with the print device and the firewall 112 associated with the cloud administration system 100.

In an embodiment, a print device 140 may be located remotely from a source computing device 120 and an application computing device 130. In an embodiment, each print device 140 may be located remotely from each source computing device 120 and each application computing device 130. In an embodiment, the network 145 over which a print device 140 may communicate with a cloud administration system 100 may be operated by an entity that is different that that which operates a network over which a source computing device 120 may communicate with the cloud administration system and/or a network over which an application computing device 130 may communicate with the cloud administration system.

In an embodiment, a print device 140 may have one or more queues 185 that may be inbound and/or outbound queues. Although inbound and outbound queues are discussed as being separate queues, it is understood that an inbound queue may perform inbound and outbound queue functions, and that an outbound queue may perform outbound and inbound functions.

In an embodiment, a print device 140 may have an inbound queue 165, such as a spooler and/or the like. An inbound spooler may be a queue that receives, stores, schedules and/or requests printing of a print job. In an embodiment, a print device 140 may have one or more outbound queues 185. An outbound queue may store print jobs and/or print device information until the print device transmits these print jobs and/or print device information. For example, as illustrated by FIG. 1A, a print device may have a RIP queue 168, a scan queue 170, a hold queue 172, an accounting information queue 174, a configuration information queue 176, a dynamic print device information queue 178, a software update queue 180, an inventory information queue 182, a license queue 184 and/or the like. Queues 185 are discussed in more detail below.

In an embodiment, a print device 140 may have a transmission module 196. A transmission module may be in communication with one or more queues 185. A transmission module 196 may be configured to transmit data from a print device 140 to a computing device, another print device and/or the like. In an embodiment, a transmission module 196 may be in communication with a cloud administration system 100. For example, a transmission module 196 may be in communication with a processing module 110 of a cloud administration system 100.

In an embodiment, a source computing device 120, an application computing device 130 and a print device 140 may not communicate directly with one another. As illustrated by FIG. 1A, the source computing device 120, the application computing device 130 and the print device 140 may communicate indirectly via a cloud administration system 100.

Figure 1B:
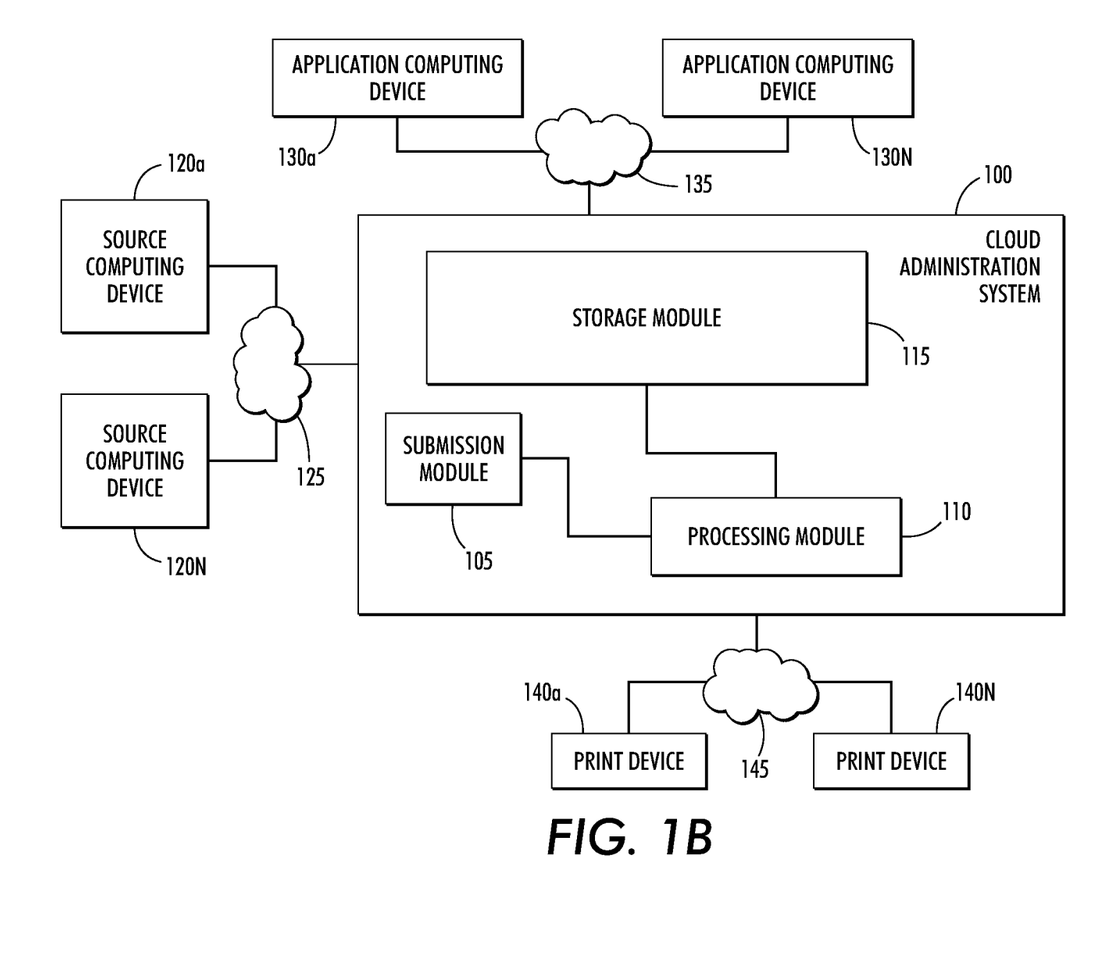

FIG. 1B depicts an exemplary cloud administration system according to an embodiment. As illustrated by FIG. 1B, a cloud administration system 100 may communicate with more than one source computing device 120*a*-N, application computing device 130*a*-N and/or print device 140*a*-N.

In an embodiment, a print device license may be associated with a print device. In an embodiment, a print device license may be associated with only one print device. In an alternate embodiment, a print device license may be associated with a plurality of print devices.

In an embodiment, a print device license may include information regarding a license term. For example, if a customer purchases a one-year license to use a print device, the print device license associated with the print device may include an indication of the one-year license term. In an embodiment, a print device license may include a unique license identifier, such as a unique alphanumeric sequence.

Figure 2:
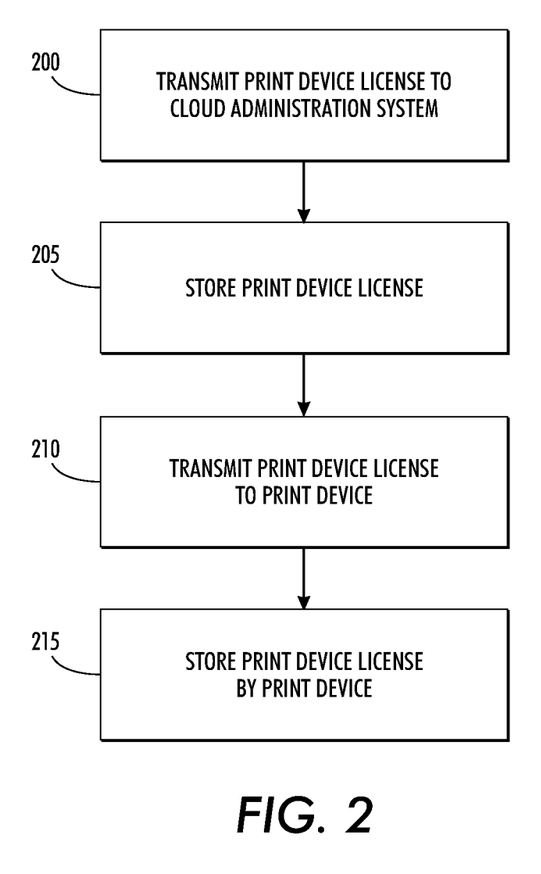
FIG. 2 illustrates an exemplary method of installing a print device license according to an embodiment.

In an embodiment, a print device license may be stored on the print device to which it corresponds. In an embodiment, a print device license may be installed on a print device using a cloud administration system. FIG. 2 illustrates an exemplary method of installing a print device license according to an embodiment. An application device may transmit 200 a print device license to a cloud administration system. The cloud administration system may store 205 the received print device. In an embodiment, the cloud administration system may store 205 a print device license in a storage module, for example the license storage module 166 illustrated in FIG. 1A. In an embodiment, the cloud administration system may transmit 210 the print device license to the print device to which it corresponds. The print device may store 215 the received print device license. In an embodiment, the print device may store 215 the received print device license in a queue, such as the license queue 184 as illustrated in FIG. 1A.

In an embodiment, a print device having a print device license may be required to check-in with a license management service at certain time intervals in order for the print device to remain operational. For example, a print device may be required to check-in with a license management service every week in order for the print device to remain operational. Additional and/or alternate time periods may be used within the scope of this disclosure.

Figure 3:
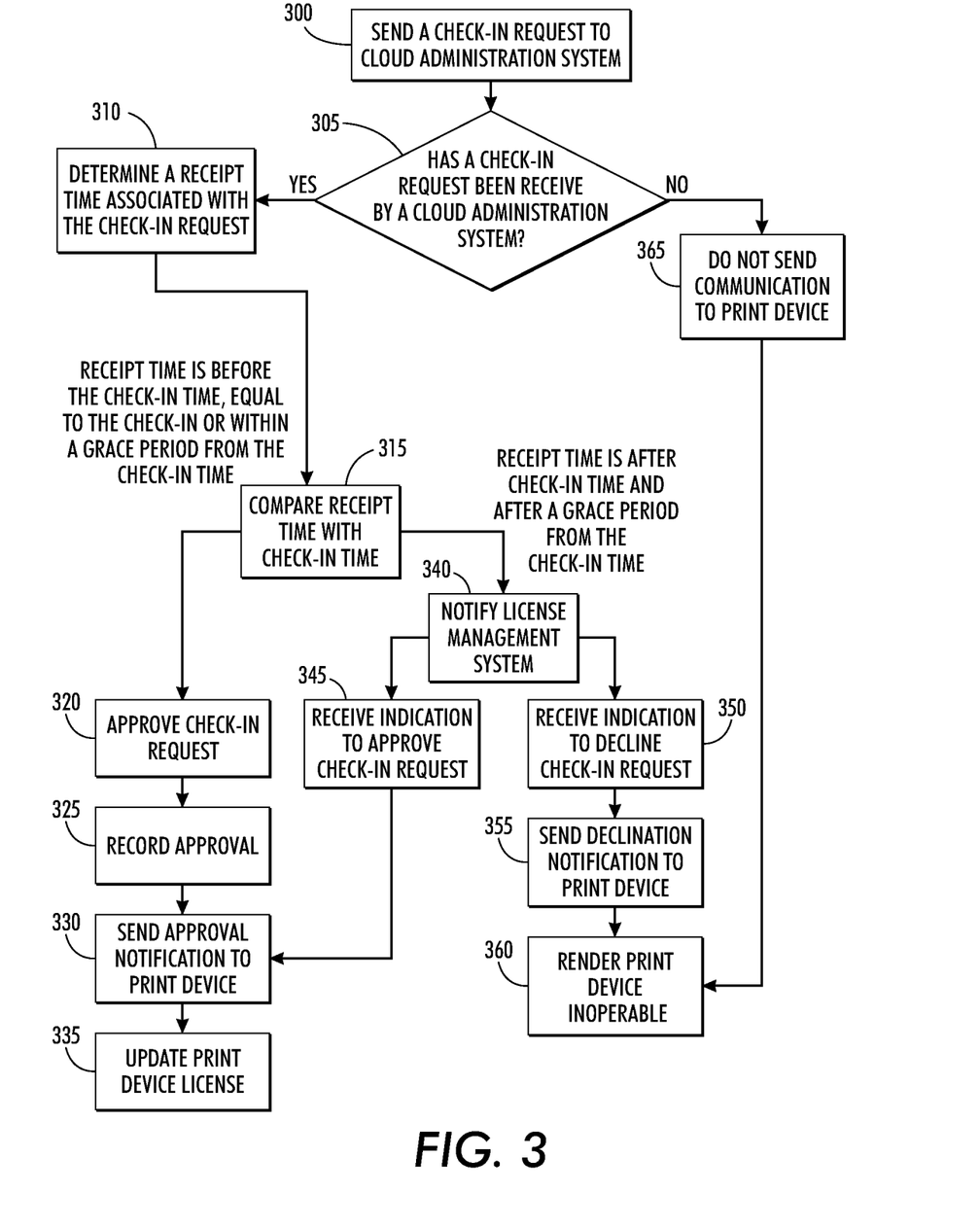
FIG. 3 illustrates an exemplary method of checking-in with a license management service according to an embodiment.

FIG. 3 illustrates an exemplary method of checking-in with a license management service according to an embodiment. As illustrated in FIG. 3, a print device license that is stored on a print device may include an indication of when the print device needs to check-in with a license management service. For example, a print device license may include a timer and/or the like. In an embodiment, a timer may be set for a period of time, and may count backwards to zero. When the timer reaches zero, the print device may check-in with the license management service.

In an alternate embodiment, a print device license may include a timer and a check-in time. The check-in time may include an indication of an amount of time until the print device needs to check-in with a license management service. For example, if a print device is to check-in with a license management service in 24 hours, the print device license of the print device may include a check-in time that includes an indication of the 24-hour time period. In an embodiment, the check-in time may be represented in seconds, minutes, hours, days, weeks, months and/or other time periods. In an embodiment, when the timer reaches the check-in time, the print device may check-in with the license management service.

In an embodiment, a print device license may include an indication of a date and/or time at which the print device is to check-in with a license management service. For example, a print device license may include an indication that the print device is to check-in with a license management service on July $1^{st}$ at 12:00 a.m. The print device may compare the indication to a clock associated with the print device. When the date and/or time of the print device license matches the date and/or time of the clock, the print device may check-in with the license management service.

In an embodiment, a print device may send 300 a check-in request to a cloud administration system. For example, a transmission module of a print device may send 300 a check-in request to a processing module of a cloud administration system. The check-in request may include information identifying the print device, such as a unique identifier and/or the like. The check-in request may include a unique identifier associated with the print device license that corresponds to the print device that is sending the check-in request.

In an embodiment, a cloud administration system may determine 305 whether it has received a check-in request from a print device. In an embodiment, the cloud administration system may determine 305 whether it has received a check-in request from a print device by a check-in time specified in the corresponding print device license. For example, if a print device is to check-in with a license management service by noon, the print device may determine 305 whether a check-in request has been received from the print device by noon.

In an embodiment, the cloud administration system may determine 305 whether it has received a check-in request from a print device within a certain grace period after the corresponding check-in time. For example, if a print device is to check-in with a license management service by noon, the cloud administration system may determine 305 whether a check-in request has been received from the print device by 1 p.m. the same day. Additional and/or alternate grace periods may be used within the scope of this disclosure.

In an embodiment, in response to receiving a check-in request from a print device, the cloud administration system may determine 310 a receipt time associated with its receipt of the check-in request. The receipt time may include an indication of the date and/or time that the cloud administration receives the check-in request. In an embodiment, the cloud administration system may compare 315 the receipt time with the check-in time associated with the print device license. If the receipt time is before the check-in time, equal to the check-in time or within a grace period from the check-in time, the cloud administration system may approve 320 the check-in request. This approval may be recorded 325 in the print device license stored on the cloud administration system. Alternatively, the approval may be recorded 325 in a file associated with the print device license.

In an embodiment, the cloud administration system may send 330 an approval notification to the print device. The approval notification may indicate that the check-in request was successfully received. In an embodiment, the approval notification may include an updated time at which the print device will need to check-in with the license management service. Upon receipt of the approval notification, the print device may update 335 the local print device license with the updated time. In an alternate embodiment, the approval notification may include an updated time period after the expiration of which the print device will need to check-in with the license management service. The print device may add the updated time period to the check-in time. In an alternate embodiment, the print device may replace the check-in time with the updated time period.

In an embodiment, if the receipt time is after the check-in time, the cloud administration system may notify 340 the license management service. For example, an email or alert may be sent to an application computing device associated with the license management service. In an embodiment, the license management service may have the option to approve the late check-in request. In an embodiment, the cloud administration system may receive 345 an indication from the license management service to approve the late check-in request. The cloud administration system may send 330 an approval notification to the print device.

In an embodiment, a cloud administration system may receive 350 an indication from the license management service to decline the late check-in request. In an embodiment, the cloud administration system may send 355 a declination notification to the print device. In an embodiment, the print device may be rendered inoperable 360 in response to receiving a declination notification. In an embodiment, the declination notification may include one or more instructions for removing and/or disabling the print device license. If the print device license is removed and/or disabled, the print device may be rendered inoperable 360.

In an embodiment, the print device license may include one or more instructions for disabling or otherwise making the print device inoperable in response to receiving a declination notice. For example, the print device license may include one or more instructions for removing and/or disabling the print device license in response to receiving a declination notice. If the print device license is removed and/or disabled, the print device may be rendered inoperable 360.

In an embodiment, if the cloud administration system does not receive a check-in request from a print device within a period of time, the cloud administration system may not send 365 a communication to the print device. In an embodiment, if the print device does not receive a communication from the cloud administration system within a certain time period after a check-in time, the print device may be rendered 360 inoperable. In an embodiment, the print device license may include one or more instructions that remove and/or disable the print device license if the print device does not receive a communication from the cloud administration system within a certain time period after a check-in time. In an embodiment, if the print device license is removed and/or disabled, the print device may be rendered 360 inoperable. For example, if the print device does not send the cloud administration system a check-in request at the check-in time, the print device may not receive a communication from the cloud administration system. If the print device does not receive a communication, such as an approval notification, from the cloud administration system within a certain time period after the check-in time, such as one hour, the print device may be rendered 360 inoperable.

Figure 4:
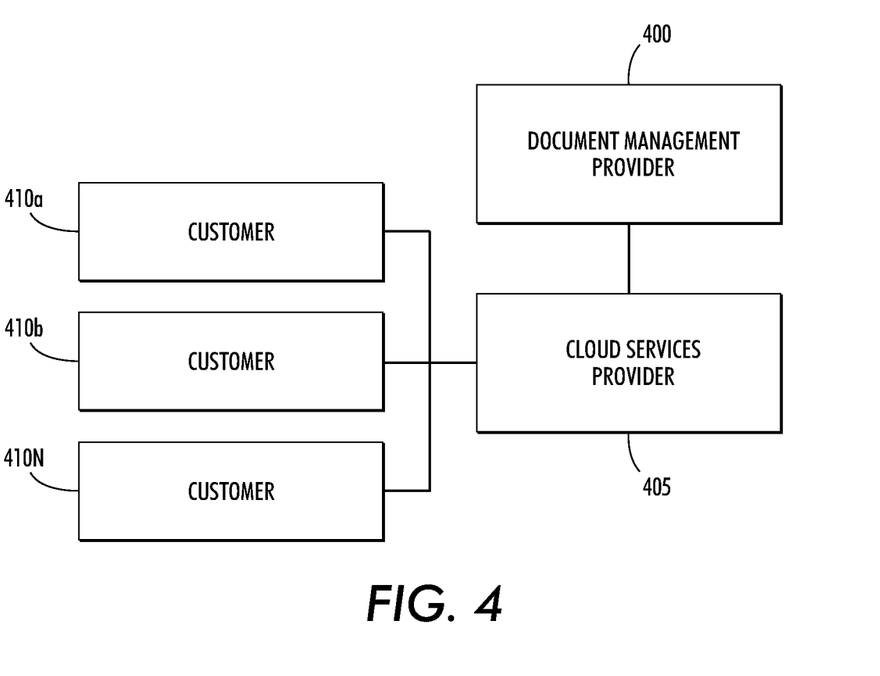
FIG. 4 illustrates an exemplary implementation of a cloud administration system according to an embodiment.

FIG. 4 illustrates an exemplary implementation of a cloud administration system according to an embodiment. A document management provider 400 may contract with a cloud services provider 405 to provide cloud services to the document management provider's customers 410a-N. A document management provider 400 may be an entity that supplies, manages and/or maintains print devices, processes print jobs and/or performs other document management services. A cloud services provider 405 may operate and/or maintain a cloud administration system to provide cloud services. Cloud services may include applications that are accessed remotely on demand from a cloud services provider that hosts the applications. Cloud services may include applications for document management, document processing, account management, print device configuration, document retention and backup, inventory management and/or the like.

In an embodiment, a computing device operated by a customer 410a-N may communicate directly with a cloud administration system. For example, a print device utilized by a customer 410a-N at the customer's location may print device license information to a cloud administration system operated by a cloud services provider 405. The cloud administration system may store the print device license information. In an embodiment, an application computing device operated by the document management provider 400 or another entity with whom the document management provider has contracted, may access print device license information from the cloud administration system.

For example, a cloud administration system may store print device license information associated with print devices operated by a customer 410a-N. The document management provider 400 may access the print device license information via an application computing device from the cloud administration system in order to monitor and track a customer's 410a-N compliance with a print device license. In an alternate embodiment, a license management service with whom the document management provider 400 contracts may access the print device license information via an application computing device from the cloud administration system in order to monitor and track compliance for the customer 410a-N.

Figure 5:
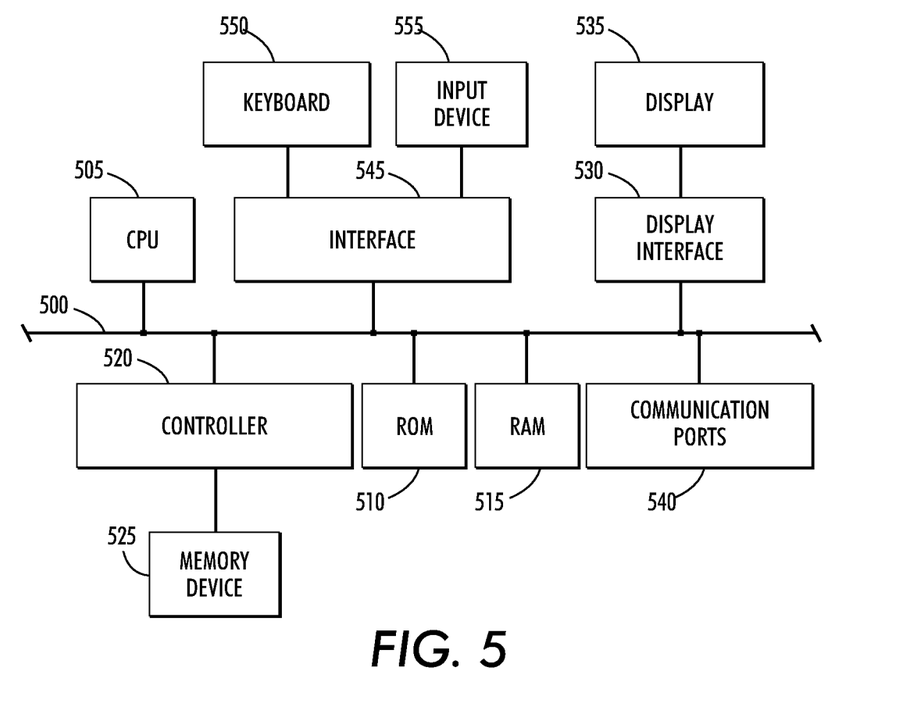
FIG. 5 depicts a block diagram of exemplary internal hardware that may be used to contain or implement program instructions according to an embodiment.

FIG. 5 depicts a block diagram of exemplary internal hardware that may be used to contain or implement program instructions, such as the process steps discussed above in reference to FIGS. 2 and 3, according to embodiments. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an exemplary processing device, computing device or processor as such terms are used within this disclosure. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible computer-readable storage medium such as a compact disk, a digital disk, flash memory, a memory card, a USB drive, an optical disc storage medium, such as a Blu-ray™ disc, and/or other recording medium.

An optional display interface 530 may permit information from the bus 500 to be displayed on the display 535 in audio, visual, graphic or alphanumeric format. Communication with external devices, such as a print device, may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A cloud administration system for managing a print device license for a remote print device, the cloud administration system comprising:
    a processing module in communication with a plurality of print devices, wherein the processing module is located remotely from each of the plurality of print devices; and
    a storage module in communication with the processing module, wherein the processing module is configured to:
        receive a print device license associated with a print device of the plurality of print devices, wherein the license comprises a term that expires after a first check-in time,
        store the print device license in the storage module,
        transmit the print device license to the print device,
        receive a first check-in request from the print device by the first check-in time,
        determine an updated check-in time,
        cause the term to be updated by sending the print device an approval notification that comprises the updated check-in time,
        in response to not receiving a second check-in request from the print device by the updated check-in time, causing the print device to become disabled,
    wherein the cloud administration system operates as a shared resource for each of the plurality of print devices.

2. The system of claim 1, wherein the processing module is further configured to send an approval notification to the print device in response to receiving the check-in request within a grace period after the check-in time.

3. The system of claim 1, wherein the processing module is further configured to enable an application computing device to access the print device license from the storage module.

4. The system of claim 1, wherein causing the print device to become disabled comprises sending a declination notice to the print device, wherein the declination notice comprises one or more of the following:
    one or more instructions for removing the license from the print device; and
    one or more instructions for disabling the license.

5. A method of managing a print device license, the method comprising:
    receiving, by a cloud administration system, from an application computing device associated with a license management service, a print device license that corresponds to a print device, wherein the license comprises a term that expires after a first check-in time;
    storing the print device license in a storage module of the cloud administration system;
    transmitting, by the cloud administration system, the print device license to a print device in communication with the cloud administration system;
    receiving a first check-in request from the print device by the first check-in time;
    determining an updated check-in time;

causing the term to be updated by sending the print device an approval notification that comprises the updated check-in time;

in response to not receiving a second check-in request from the print device by the updated check-in time, causing the print device to become disabled;

wherein the application computing device is located remotely from the cloud administration system, wherein the print device is located remotely from the cloud administration system.

6. The method of claim 5, wherein the license comprises one or more instructions for disabling the print device comprise one or more instructions for disabling the print device license.

7. The method of claim 5, wherein the license comprises one or more instructions for disabling the print device comprise one or more instructions for removing the print device license.

8. The method of claim 5, wherein causing the print device to become disabled comprises sending a declination notice to the print device, wherein the declination notice comprises one or more of the following:

one or more instructions for removing the license from the print device; and one or more instructions for disabling the license.

* * * * *